United States Patent
Shashikumar et al.

(10) Patent No.: US 8,463,819 B2
(45) Date of Patent: Jun. 11, 2013

(54) CENTRALIZED ENTERPRISE SECURITY POLICY FRAMEWORK

(75) Inventors: Gurudatt Shashikumar, Foster City, CA (US); Hari V. N. Sastry, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1318 days.

(21) Appl. No.: 11/084,497

(22) Filed: Mar. 17, 2005

(65) Prior Publication Data

US 2006/0059539 A1 Mar. 16, 2006

Related U.S. Application Data

(60) Provisional application No. 60/606,799, filed on Sep. 1, 2004.

(51) Int. Cl.
*G06F 7/00* (2006.01)
*G06F 17/30* (2006.01)

(52) U.S. Cl.
USPC .......... 707/796; 707/780; 707/781; 707/785; 707/793; 707/803; 707/828; 707/829; 707/830; 713/168; 713/182; 713/183; 713/184; 726/1

(58) Field of Classification Search
USPC ........................................ 713/201
See application file for complete search history.

(56) References Cited

U.S. PATENT DOCUMENTS

| | | | |
|---|---|---|---|
| 6,484,261 B1 * | 11/2002 | Wiegel ............................. | 726/11 |
| 6,523,027 B1 * | 2/2003 | Underwood ...................... | 707/4 |
| 6,587,874 B1 * | 7/2003 | Golla et al. .................... | 709/220 |
| 2002/0083340 A1 * | 6/2002 | Eggebraaten et al. ........ | 713/201 |
| 2002/0178380 A1 * | 11/2002 | Wolf et al. .................... | 713/201 |
| 2003/0177388 A1 * | 9/2003 | Botz et al. ..................... | 713/201 |
| 2004/0064742 A1 * | 4/2004 | Excoffier et al. ............. | 713/202 |
| 2004/0193912 A1 * | 9/2004 | Li et al. ......................... | 713/200 |
| 2004/0210756 A1 * | 10/2004 | Mowers et al. ................ | 713/168 |
| 2005/0278384 A1 | 12/2005 | Lin et al. | |
| 2006/0123024 A1 | 6/2006 | Sathyanarayan et al. | |
| 2007/0118878 A1 | 5/2007 | Sastry et al. | |
| 2007/0118892 A1 | 5/2007 | Sastry et al. | |

* cited by examiner

*Primary Examiner* — Nathan Flynn
*Assistant Examiner* — Bryan Wright
(74) *Attorney, Agent, or Firm* — Vista IP Law Group, LLP

(57) ABSTRACT

A centralized enterprise security and provisioning policy framework is described. Enterprise wide security and provisioning is stored in a hierarchical fashion in a centralized LDAP based Directory server. Each policy and user maps directly to a unique entry in the directory. Policy entries can be created at specific administrative points in the Directory Information Tree instead of having to duplicate these policies as attributes of every user entry in the directory. The policies can be classified into provisioning, authentication, and authorization policies.

33 Claims, 8 Drawing Sheets

CENTRALIZED ENTERPRISE SECURITY POLICY FRAMEWORK

CROSS-REFERENCE TO RELATED APPLICATIONS

This application claims the benefit of U.S. Provisional Application 60/606,799 filed on Sep. 1, 2004, which is hereby incorporated by reference as if fully set forth herein.

BACKGROUND AND SUMMARY

In any given enterprise, there may be several e-business applications that are deployed. In conventional systems, each of these applications will have their own security policies stored in their respective repositories. Allowing these applications to maintain their own policy repositories and embedded policy decision services is inconvenient and unscalable from an administrative perspective. For example, any new application that is installed must maintain and evaluate its own security policies, which is a major administrative inconvenience. Also these policies cannot be shared across applications, therefore, every application must have its own policy enforcement engine to enforce security policies.

Thus, there is a growing need for a centralized enterprise security and provisioning policy framework that can provide capability to define prescriptive policies for various administrative domains, provide capability to define policies for hierarchical administrative domains for a fine-grained delegated administration, provide infrastructure to build policy servers for various security and provisioning policy evaluation decisions, lower application development, deployment and management costs due to the integration with a unified identity and security management, and enable administration and administration delegation of enterprise security policies.

Embodiments of a method and mechanism for a Centralized Enterprise Security Policy Framework which include storing and enforcing enterprise wide security and provisioning policies in a centralized LDAP directory server are disclosed.

DETAILED DESCRIPTION

Some embodiments solve the aforementioned shortcomings by storing and enforcing enterprise wide security and provisioning policies in a centralized server. In one embodiment, these provisioning policies and application user identities are stored in a hierarchical fashion in a Lightweight Directory Access Protocol (LDAP) based Directory Server. Each policy and user identity maps to a unique entry in the directory. Each application no longer requires a separate policy repository or server. Storing policies and user information using a hierarchical information model enables enforcing these policies in a prescriptive manner. That is, the policy entries can be created at specific administrative points in the Directory Information Tree (DIT) instead of having to duplicate these policies as attributes of every user entry in the directory. The administrative points in the tree can be more quickly and easily searched as opposed to searching every user.

Figure 1A:
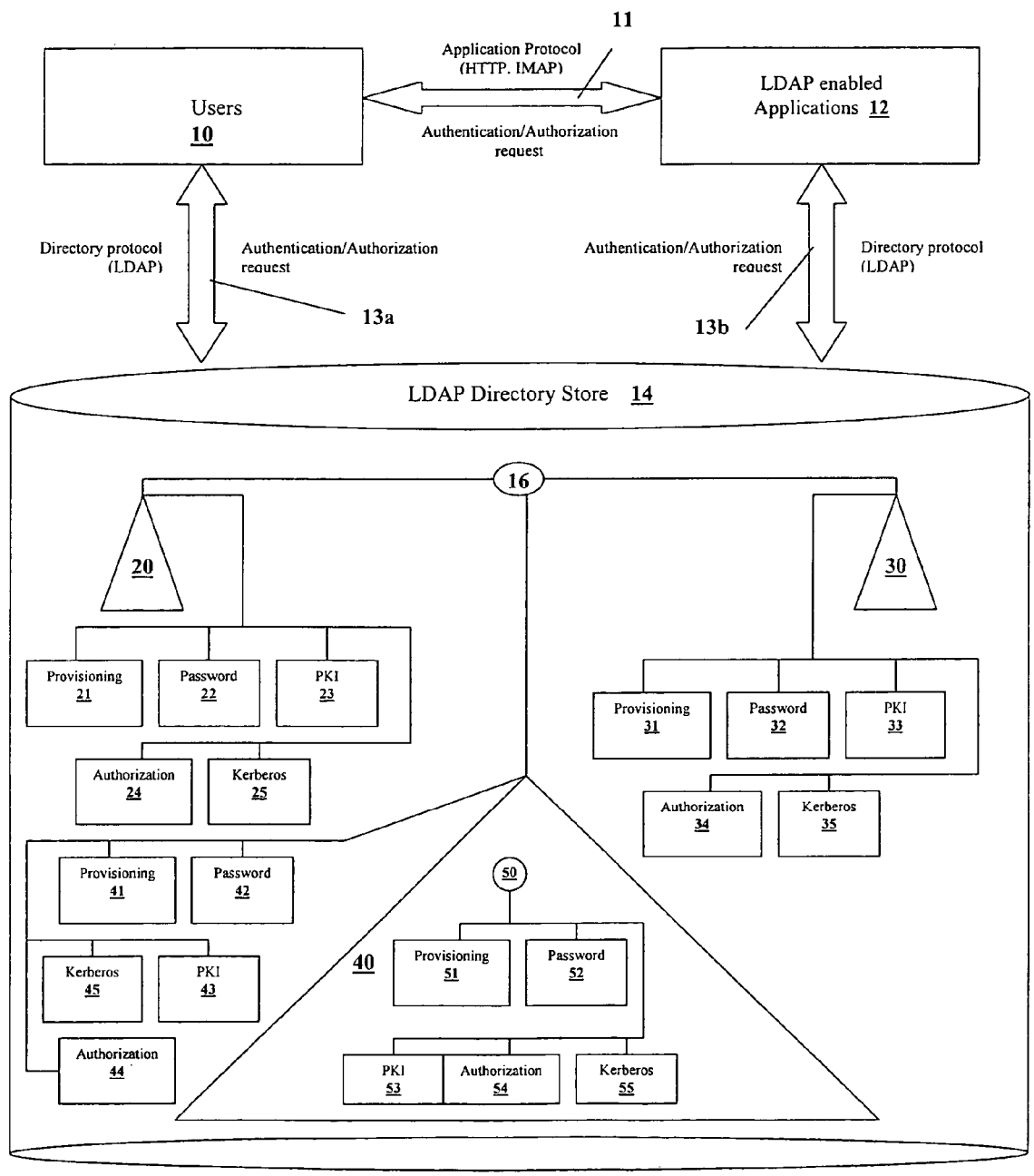
FIG. 1A is a representation of one embodiment of a centralized enterprise security and provisioning policy framework.

For example, FIG. 1A shows an example centralized enterprise security policy framework. Users 10, can request authentication from LDAP enabled applications 12 over application communication protocol 11. Users 10 can also request authentication directly from the LDAP Directory Store 14 via the LDAP Directory protocol 13a. Applications 12 can also request authentication on behalf of the user from the LDAP Directory Store 14 via the LDAP Directory protocol 13b. Applications 12 can also request authentication from the LDAP Directory Store 14 via the LDAP Directory protocol 13b. The LDAP Directory Store 14, holds all the policy information for the enterprise. As an example, this enterprise has user groups 20, 30, and 40. These user groups can hold many users—from just hundreds to many thousands. User groups 20 and 30 show a group of policies that are created in the root of the group. This indicates that the policies are prescriptive for the whole user group. That is, each user in user group 20 uses policies 21, 22, 23, 24, and 25 and each user in user group 30 uses policies 31, 32, 33, 34, and 35. The process can also check for user specific policies like those shown in user group 40. For example, user 50 possess his own policies 51, 52, 53, 54, and 55 that will be in effect for him. However, any users in user group 40 that do not have their own specific policies can use the prescriptive policies 41, 42, 43, 44, and 45 set up at the root of user group 40.

The policies that can be created and enforced by the Directory can be classified into provisioning, authentication, and authorization policies. These policies are described in detail below.

An example use of a enterprise wide security and provisioning policy is shown in FIG. 1A and includes receiving a request 152, fetching the corresponding user entry from the DIT 154, and applying the policy to determine if the request is allowed or denied 156.

1. Provisioning Policies

In one embodiment, provisioning policies are enforced primarily at the time of user provisioning. A Provisioning Policy grants a person access to many types of managed resources, such as the Information Technology Investment Management (ITIM) server, Windows NT servers, Solaris servers, and so on. Access to a resource defined as a target on a Provisioning Policy is guaranteed for a person as long as the person is a member of the policy. The membership types for a policy are categorized as one of the following: all persons in an organization, a person's organizational role, or other (people not in an organizational role that is directly associated with a Provisioning Policy).

If the Provisioning Policy grants access to all people in an organization, then all people in the Organization have access to the service. If the Provisioning Policy grants access to an Organizational Role, then those people who belong to a particular Organizational Role are granted access to the service. As soon as a person has an account and can access the managed resource, the functions that can be performed within the managed resource are administered by the service.

2. Authentication Policies

Authentication policies are created at specific administrative points in the directory and enforced at the time of user authentication. Some of the authentication policies implemented are Password policies, Kerberos policies, and Public Key Infrastructure (PKI) policies. Each of these policies corresponds to a different mode of authentication as explained below, and these policies can be enforced at both an entry specific level and a prescriptive level.

When the directory server receives a user authentication request, the server first looks for any entry level policies that may be specified. If there are entry specific policies, those policies are enforced for that particular user. If there are no entry specific policies, the prescriptive policy specified at the nearest administrative point is enforced. If there are no prescriptive policies in the directory, then the default policy for that mode of authentication will be enforced.

Password Policies

Password policies are enforced for Directory user password-attribute-based authentication. Password policies can be categorized into password value policies and password state policies.

Password values policies are intended to deter a user from choosing easily detectable passwords. Some examples of the common password value policies include, enforcing a minimum and maximum length on the password, enforcing the presence of a minimum number of alphabetic, numeric and special characters, disallowing users from choosing their usernames, telephone numbers and simple words (e.g., welcome) as passwords, enforcing the maximum consecutive character types (alphabetic/numeric/punctuation), and restricting the maximum number instances of any character. In another embodiment, other sophisticated password value policies can be enforced via customized plug-ins.

Figure 1B:
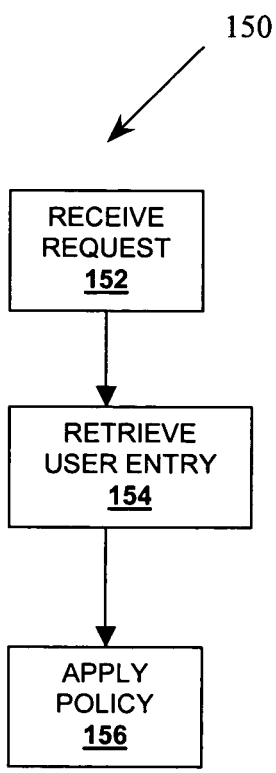
FIG. 1B is a representation of process 150, a general validation process.
Figure 1C:
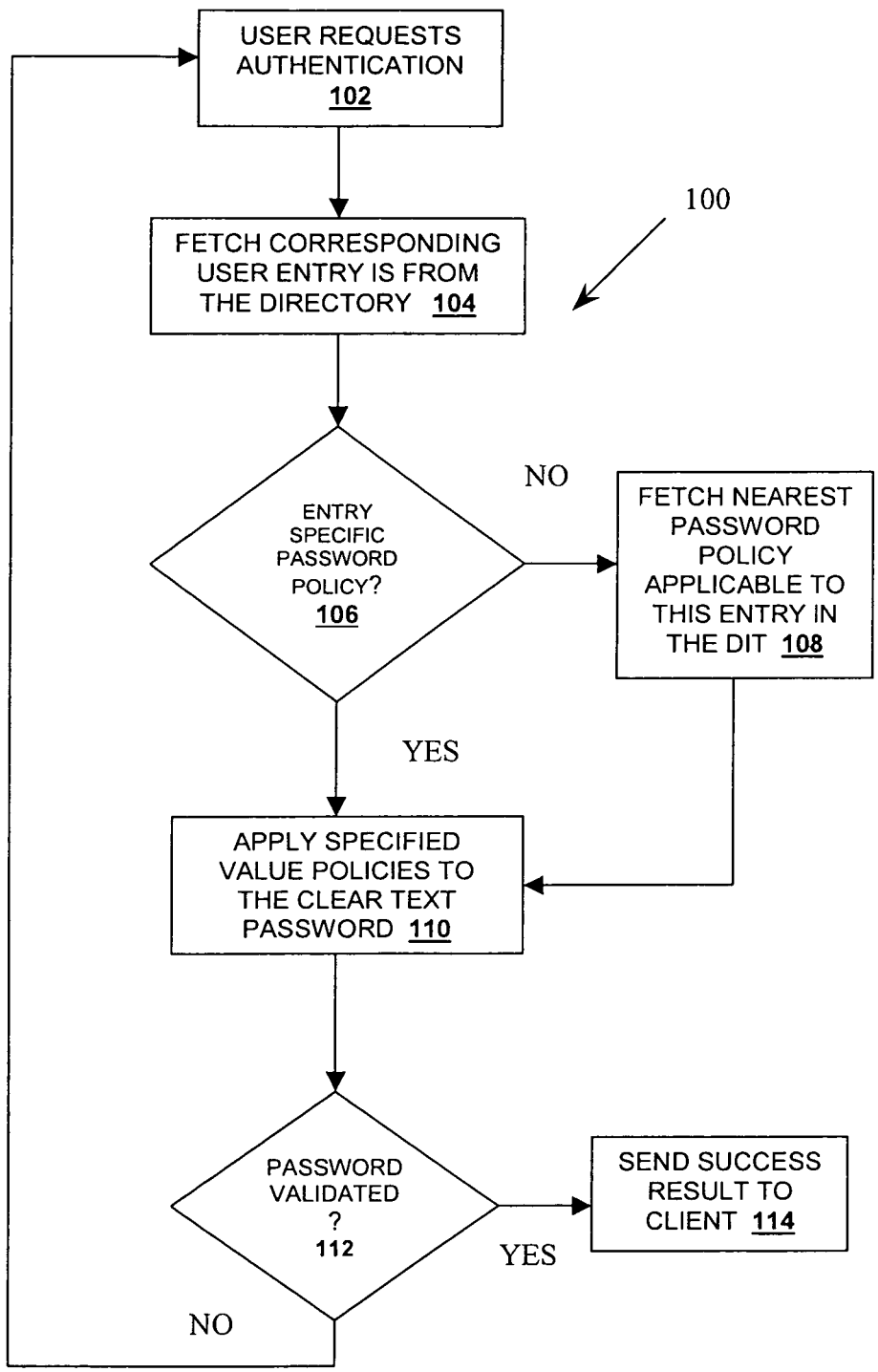
FIG. 1C is a representation of process 100, validation of clear text password values during modification.

FIG. 1B illustrates how clear text password values are validated during modification in one embodiment. In process action 102, a user requests to modify the password. The corresponding user entry is fetched from the LDAP directory in process action 104. Process action 106 determines if there is a specific entry level password policy. If there is not a specific entry level password policy that is active, process action 108 fetches the nearest password policy that is applicable to this entry in the Directory Information Tree (DIT). In the search for the nearest policy, process 100 will first search for the prescriptive policy at the nearest administration point in the DIT. If there is no prescriptive policy in the DIT, then the default password policy is enforced. In process action 110, the password policy is applied to the entered password. This policy is either the policy that was fetched from the DIT or a specific policy found during process action 106. Process action 112 determines if the entered password complies with the password policy. If it does, a validation successful response is sent to the client. If the password does not comply with the policy, process 100 is returned to process action 102 allowing the user to modify the password.

Password state policies are intended to prevent brute force attacks and dictionary attacks on user passwords. Example password state policies include: Password expiration, Password expire warning and grace logins, Account lockout, Password history, and Password minimum age.

In another embodiment, a comprehensive password management service can also include a self-service password reset feature. This enables users to reset their own passwords in the event of account lockout, password expiration, and forgotten passwords. This drastically reduces the volume of help desk calls, the majority of which are requests for password reset. The self-service reset of passwords can be achieved via the Delegated Administration Service which enables users to set up their own password hints.

Figure 2:
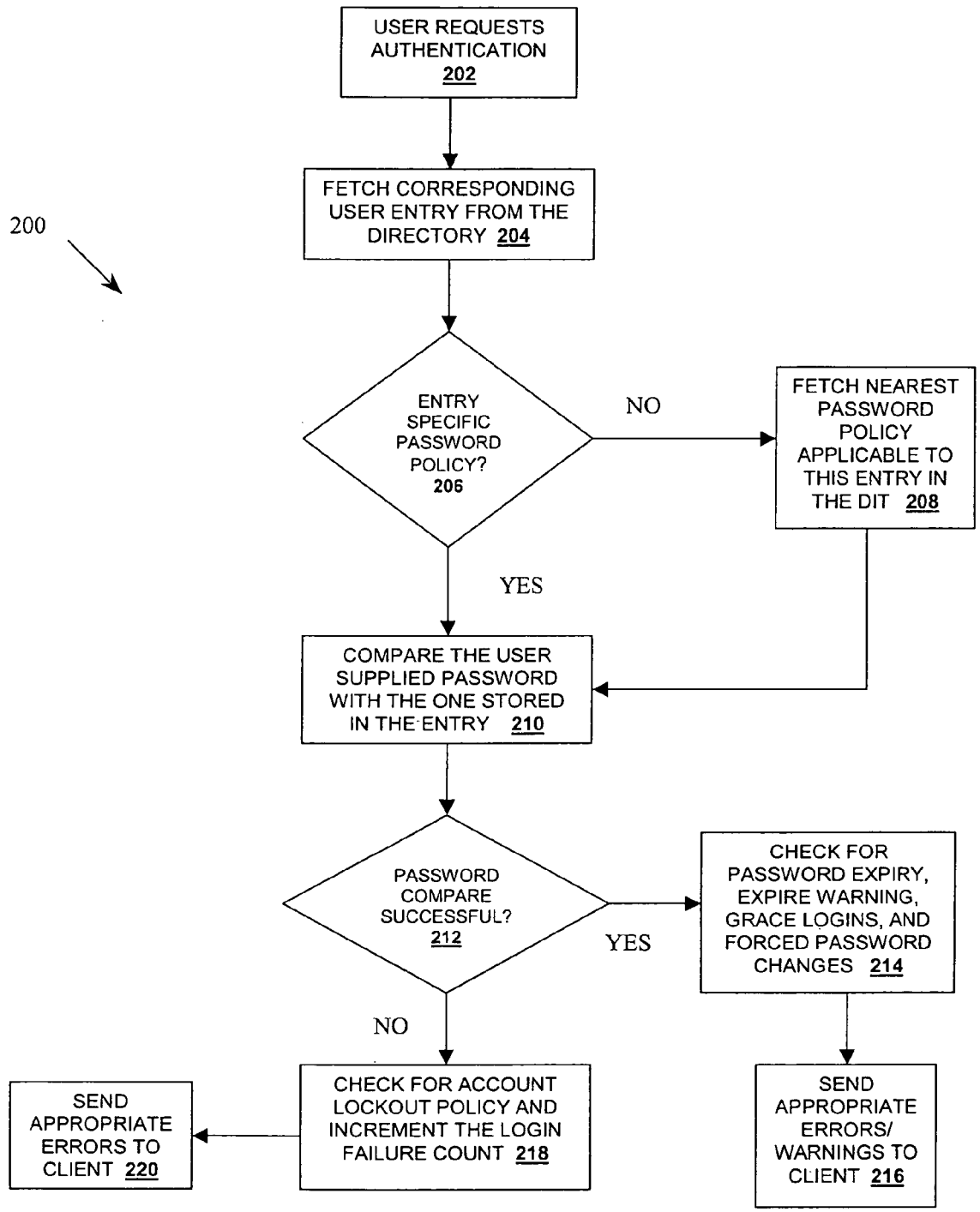
FIG. 2 is a representation of process 200, enforcement of password state policies during authentication.

FIG. 2 illustrates how account state policies are enforced during authentication according to one embodiment. In process action 202 a user requests authentication. The corresponding user entry is fetched from the DIT in process action 204. Process action 206 determines if there is a specific password policy in place. If not, process action 208 fetches the nearest password policy that applies to the entry. In the search for the nearest policy, process 200 will first search for the prescriptive policy at the nearest administration point in the DIT. If there is no prescriptive policy in the DIT, then the default password policy is enforced. Process action 210 compares the entered password with the stored password. Process action 212 determines if the password comparison is successful (i.e, if the entered password matched the stored password). If the passwords match, process action 214 checks the expiration information. Example expiration information includes password expiration, expire warning, grace log-ins, and forced password changes. Process action 216 sends any appropriate error or warning messages to the client. If the passwords do not match, process 218 checks for an account lockout policy, and increments the login failure count. Process action 220 sends the appropriate error messages to the client.

Kerberos Policies

Kerberos is a network authentication protocol. It is designed to provide strong authentication for client/server applications by using secret-key cryptography. Kerberos policies are enforced for kerberos ticket based authentication. Example Kerberos policies include: Enforce User Logon Restrictions, Maximum Lifetime That a User Ticket Can Be Renewed, Maximum Service Ticket Lifetime, Maximum Tolerance for Synchronization of Computer Clocks, and Maximum User Ticket Lifetime.

Enforce User Logon Restrictions—When this option is enabled, the Key Distribution Center (KDC) validates every request for a session ticket by examining the user rights policy on the target computer to verify that the user has the right either to log on locally or to access the computer from the network. It is also a check to ensure the requesting account is still valid.

Maximum Lifetime That a User Ticket Can Be Renewed—This is the maximum lifetime of a ticket (either a Ticket Granting Ticket (TGT) or a session ticket) In one embodiment, the policy specifies this is for a "user ticket." No ticket can be renewed after this time.

Maximum Service Ticket Lifetime—A "service ticket" is a session ticket and the lifetime of a service ticket must be less than the setting for "Maximum user ticket lifetime."

Maximum Tolerance for Synchronization of Computer Clocks—This Kerberos policy sets a tolerance amount of minutes. When the different between the KDC clock and the Kerberos client's clock reaches the tolerance amount, tickets are no longer issued for the client. This is a deterrent against Replay attacks.

Maximum User Ticket Lifetime—A "user ticket" is a ticket granting ticket and must be renewed after this time (i.e., the ticket will not exist after this time unless renewed).

Figure 3:
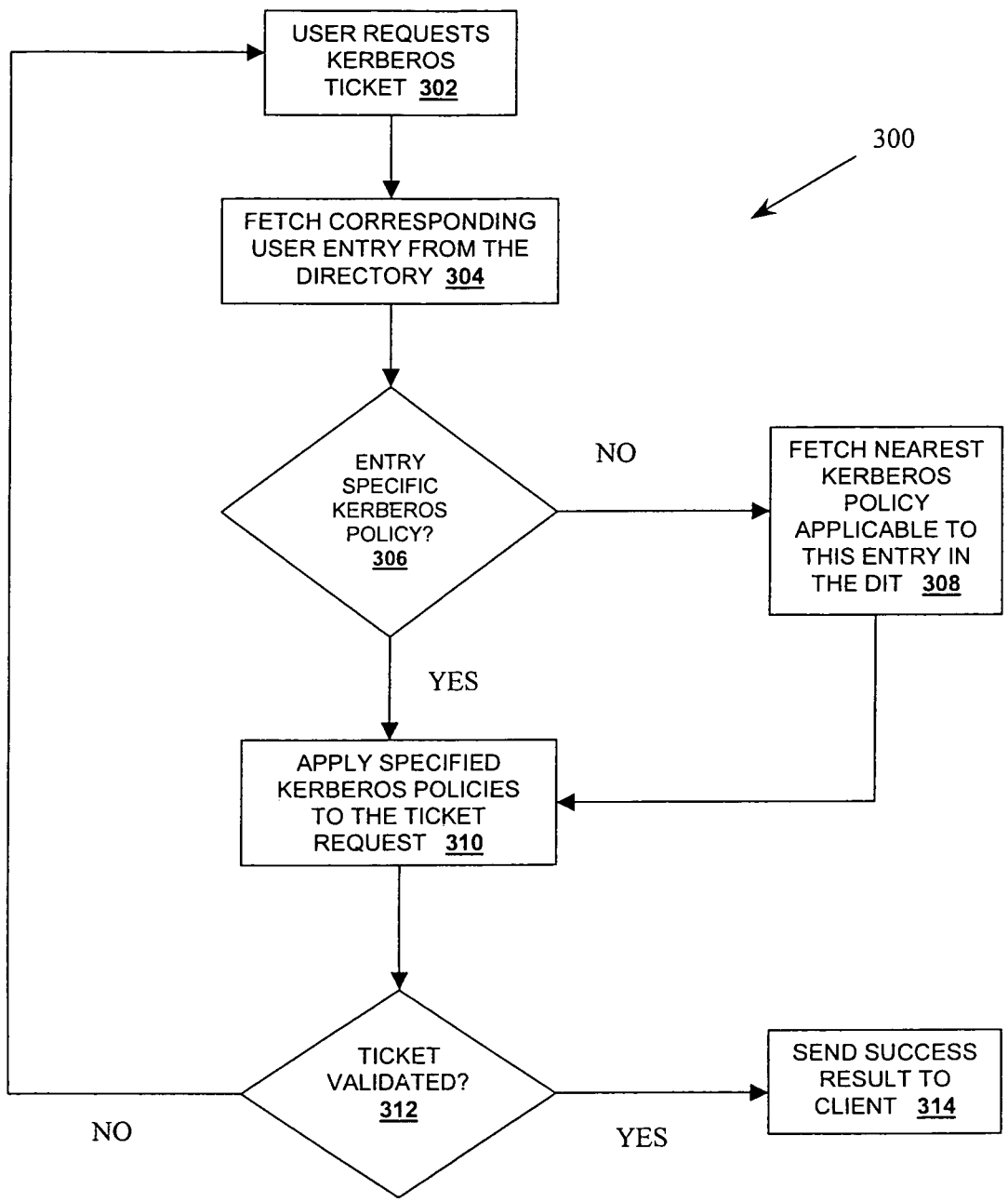
FIG. 3 is a representation of process 300, enforcement of Kerberos policies.

FIG. 3 illustrates how Kerberos ticket policies are enforced during authentication according to one embodiment. In process action 302 the user requests a Kerberos ticket. The corresponding user entry is fetched from the Directory Information Tree (DIT) in process action 304. Process action 306 determines if there is a specific Kerberos policy in place. If not, process action 308 fetches the nearest Kerberos policy applicable. In the search for the nearest policy, process 300 will first search for the prescriptive policy at the nearest administration point in the DIT. The there is no prescriptive policy in the DIT, then the default kerberos policy is enforced. The specific or fetched Kerberos policy is applied to the ticket request in process action 310. Process action 312 determines if the ticket is validated. If the ticket is validated, a success message is sent to the client in process action 314. If the ticket is not validated, process 300 returns to process action 302 to allow the user to request another Kerberos ticket.

PKI Policies

PKI policies are enforced for certificate based authentication and these policies can be categorized into constraints specific policies and extension based policies. Some of the common constraint specific policies are described in the following paragraphs.

Key Algorithm Constraint—This is to certify only those keys that are generated using a cryptographic algorithm, such as the RSA algorithm are used.

RSA Key Constraint—This policy certifies only RSA keys of specified lengths are used.

Issuance Validity Constraints—This policy checks whether or not a certificate has expired or is about to expire.

Revocation Constraints—This policy allows or rejects requests for revocation of expired certificates.

Unique Certificate Constraints—This policy restricts certificates from being issued to the same name for the same purpose.

Figure 4:
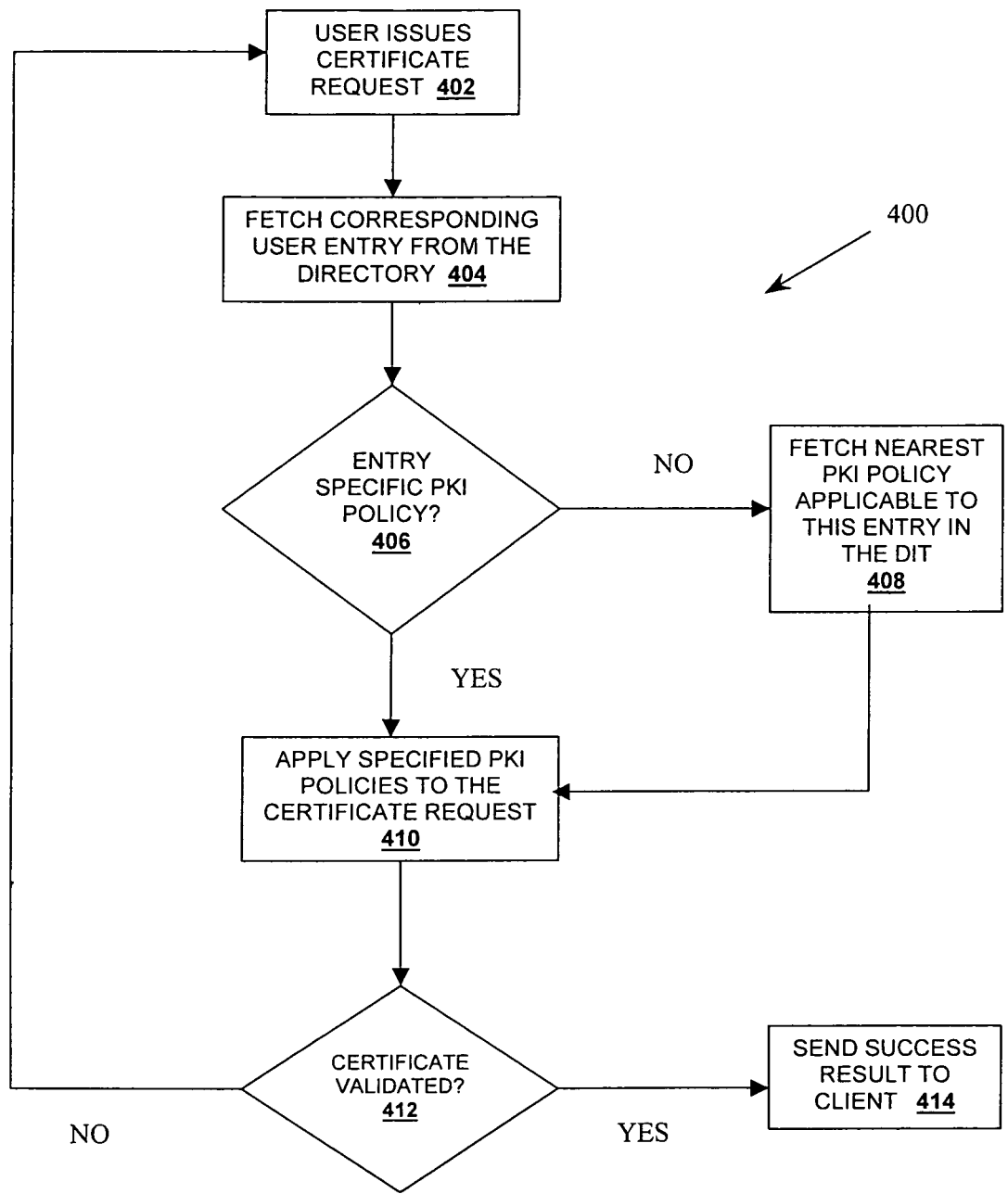
FIG. 4 is a representation of process 400, enforcement of Public Key Infrastructure (PKI) policies.

FIG. 4 illustrates how account PKI policies are enforced during authentication according to one embodiment. In process action 402 a user issues a certificate request. The corresponding user entry is fetched from the DIT in process action 404. Process action 406 determines if there is a specific PKI policy in place. If not, process action 408 fetches the nearest applicable PKI policy from the DIT. In the search for the nearest policy, process 400 will first search for the prescriptive policy at the nearest administration point in the DIT. If there is no prescriptive policy in the DIT, the default PKI policy is enforced. Process action 410 applies the PKI policy, either the entry specific or the one fetched from the DIT, to the certificate request. Process action 412 determines if the certificate is validated. If the certificate is validated, process action 414 sends a success message to the client. If the certificate is not validated, process 400 returns to process action 402 to allow the user to request another certificate.

3. Authorization Policies

In another embodiment, authorization policies like Role Based Access Control (RBAC) policies can be specified and enforced in the directory server using this framework.

The RBAC authorization model allows a wide range of access control policies to be specified in a relatively simple way. A common authorization model shared by a wide range of applications will simplify authorization administration. The same methods can be used to control access in a large number of applications. In this scenario, the Directory server not only serves as the central repository of roles and their associated permissions but also as an authorization policy enforcement engine.

The RBAC framework can support an enterprise deployment model with tools and interfaces for centralized administration of all applications. The set of operations that require authorization and the permissions required to exercise them can be determined at design time. Optionally, these permissions may be assigned to roles that are also defined at application design time. At deployment time, an administrator can construct new roles based on these predefined roles and permissions and assign them to users.

To support the enforcement of these authorization policies, the Directory server implements an authorization evaluation and enforcement engine that can answer questions concerning the policy. This will allow applications to determine such things as:

(1) The set of roles assigned to a user; or
(2) The permissions derived from a set of roles; or
(3) Whether a user with a given set of roles can perform a specific operation on a specified object.

The usage model is conceptually quite simple. The application relies on the DIT to make all authorization decisions for it. The application designer must identify the set of operations it wishes to protect. Each such operation must be mapped to a set of required permissions (i.e., operations paired with object identifiers).

Figure 5:
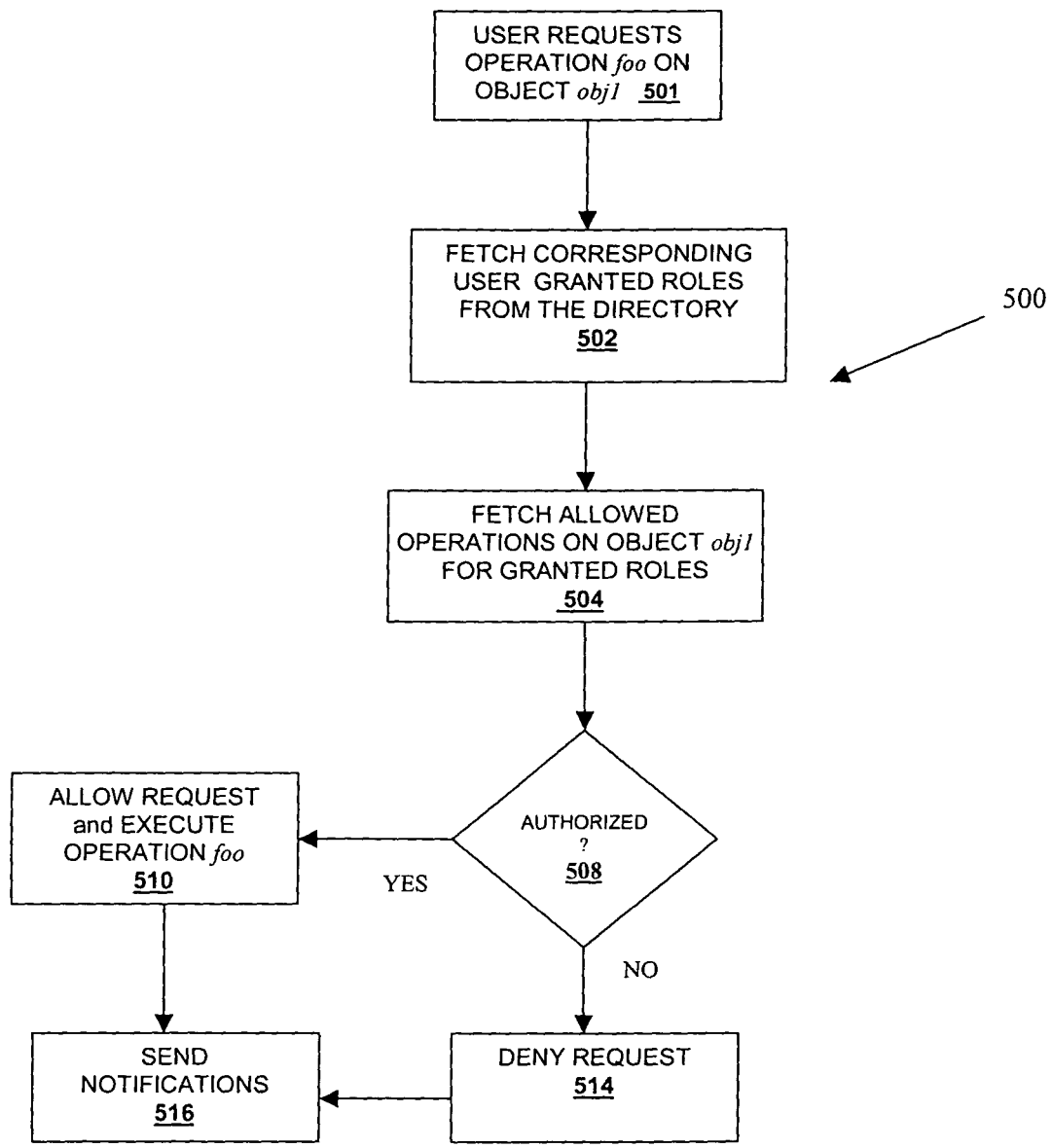
FIG. 5 is a representation of process 500, enforcement of Authorization policies.

When a user is authenticated, the authorization policy server will be queried to determine what roles are available for the session. Before executing an operation on the session, the application must query the DIT to determine if the session's roles provide the permissions required to execute the operation. If so, the operation is executed. If not, it is rejected. This interaction is shown in FIG. 5.

The interaction begins with a request to execute operation foo on object obj1 in process action 501. The application receives the request on an authenticated session. When the session was authenticated, the application queried the Directory Server to determine the roles this user had been granted (r1, r2, r3) 502. Process action 504 fetches the operations that the granted roles are allowed to perform on the specified object (obj1) form the DIT. Process action 508 compares the set of authorized operations against the requested operation (i.e., foo) and determines if the requested operation is authorized. If the operation is authorized, process action 510 allows the request and executes the operation foo. If the operation is not authorized, process action 514 denies the request for execution of the operation. Process action 516 sends the appropriate authorization or rejection notification.

System Architecture Overview

Figure 6:
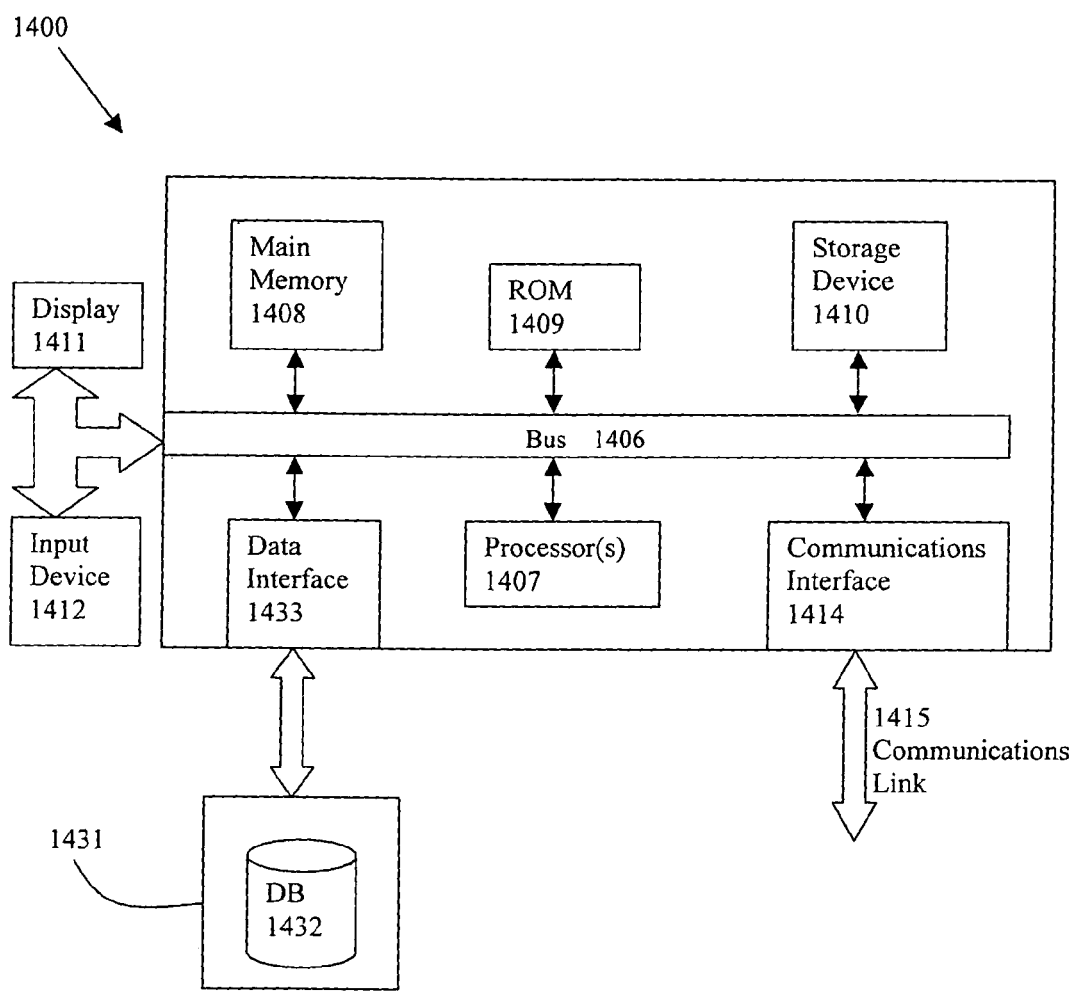
FIG. 6 is a representation of an example system to implement a centralized enterprise security and provisioning policy framework.

The execution of the sequences of instructions required to practice the embodiments may be performed by a computer system 1400 as shown in FIG. 6. In an embodiment, execution of the sequences of instructions is performed by a single computer system 1400. According to other embodiments, two or more computer systems 1400 coupled by a communication link 1415 may perform the sequence of instructions in coordination with one another. Although a description of only one computer system 1400 will be presented below, however, it should be understood that any number of computer systems 1400 may be employed to practice the embodiments.

A computer system 1400 according to an embodiment will now be described with reference to FIG. 6, which is a block diagram of the functional components of a computer system 1400. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem, or the communication link 1415 may be the Internet, in which case the communication interface 1414 may be a dial-up, cable or wireless modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions. Thus, embodiments are not limited to any specific combination of hardware circuitry and/or software. Logic refers to hardware, software or any combination of hardware and software.

The term "computer-usable medium," as used herein, refers to any medium that provides information or is usable by the processor(s) 1407. Such a medium may take many forms, including, but not limited to, non-volatile and volatile media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

We claim:

1. A computer-implemented method for authenticating using a centralized enterprise security framework, comprising:

using a processor for performing:

receiving a plurality of operation requests from a plurality of different applications at the centralized enterprise security framework, wherein the plurality of operation requests comprise a first request from a first application and a second request from a second application, and the plurality of different applications comprise the first application and the second application;

retrieving a plurality of entries from a directory structure within the centralized enterprise security framework, wherein the directory structure stores the plurality of entries hierarchically, and the plurality of entries comprise a first authentication information for the first request and a second authentication information for the second request;

validating, by using a processor, the first operation request by accessing the first authentication information and validating the second operation request by accessing the second authentication information, wherein the first and second authentication information are stored within the centralized enterprise security framework in a hierarchical manner at administrative points that define hierarchical relationships amongst users of the plurality of different applications of the centralized enterprise security framework such that the first authentication information or second authentication information is associated with two or more operation requests of the plurality of operation requests made by different users, and the first authentication information is not stored locally in a first policy repository of the first application and the second authentication information is not stored locally in a second policy repository of the second application; and storing the first and second operation requests in a non-transitory computer-usable medium or displaying the first and second operation requests on a display device.

2. The method of claim 1 wherein validating the first or second operation request comprises, sending a validation message to an originator of the first or second operation request; and invalidating the first or second operation request if the comparison between the first or second authentication information and the first or second operation request was not successful.

3. The method of claim 2, wherein the first or second operation request is for a kerberos ticket.

4. The method of claim 2, wherein the first or second operation request is for a public key infrastructure certificate.

5. The method of claim 2, wherein the first or second operation request is for password modification.

6. The method of claim 2, wherein the first or second operation request is for authentication.

7. The method of claim 2, wherein the first or second operation request is for operation authorization.

8. The method of claim 7, further comprising:
sending a rejection message, if the comparison between the first or second authentication information and the first or second operation request was not successful;
checking for an account lockout policy; and
incrementing a login failure count.

9. The method of claim 8, further comprising checking a plurality of password state policy information, the plurality of password state policy information including password expiration information, expiration warning information, number of grace logins information, and forced password change count information.

10. The method of claim 9, wherein the checking produces warning messages, the warnings being included in the validation message.

11. The method of claim 1, wherein the first or second operation request may originate from a plurality of applications, at least one of the plurality of applications not possessing a separate policy repository or server.

12. A centralized enterprise security policy framework comprising:
an LDAP database server including a directory information tree;
a plurality of security policies for a plurality of different applications, wherein the plurality of security policies comprise a first security policy associated with a first application and a second security policy associated with a second application, wherein the plurality of different applications comprises the first application and the second application, in which one or more of the security policies are created at administrative points that define hierarchical relationships amongst users of the plurality of different applications in the directory information tree; and
a plurality of user identities, wherein the plurality of user identities comprise a first user identity and a second user identity, wherein a first security policy and user identity combination maps to a first unique entry in the directory information tree and a second security policy and user identity combination maps to a second unique entry in the directory information tree, wherein the directory information tree stores the plurality of security policies and the plurality of user identities hierarchically within the LDAP server and not storing the first unique entry locally in a first policy repository of the first application and not storing the second unique entry locally in a second policy repository of the second application,
such that the directory information tree comprises the first and second unique entries associated with the first and second applications.

13. The centralized enterprise security policy framework of claim 12, wherein the first or second security policy is a password value policy.

14. The centralized enterprise security policy framework of claim 12, wherein the first or second security policy is a password state policy.

15. The centralized enterprise security policy framework of claim 12, wherein the first or second security policy is a kerberos ticket policy.

16. The centralized enterprise security policy framework of claim 12, wherein the policy is a public key infrastructure policy.

17. The centralized enterprise security policy framework of claim 12, wherein the first or second security policy is a provisioning policy.

18. The centralized enterprise security policy framework of claim 12, wherein the first or second policy is a role based access control policy.

19. The centralized enterprise security policy framework of claim 12, wherein a request may originate from the plurality of different applications, at least one of the plurality of different applications not possessing a separate policy repository or server.

20. A computer program product embodied on a non-transitory computer readable storage medium, the non-transitory computer readable storage medium having stored thereon a sequence of instructions which, when executed by a processor, causes the processor to execute a method for authenticating using a centralized enterprise security framework, the method comprising:
receiving a plurality of operation requests from a plurality of different applications at a centralized enterprise security framework, wherein the plurality of operation requests comprise a first request from a first application and a second request from a second application, and the plurality of different applications comprise the first application and the second application;
retrieving a plurality of entries from a directory structure within the centralized enterprise security framework, wherein the directory structure stores the plurality of entries hierarchically, and the plurality of entries comprise a first authentication information for the first request and a second authentication information for the second request;
validating the first operation request by accessing the first authentication information and validating the second operation request by accessing the second authentication information, wherein the first and second authentication information are stored within the centralized enterprise security framework in a hierarchical manner at administrative points that define hierarchical relationships amongst users of the plurality of different applications of the centralized enterprise security framework such that the first authentication information or second authentication information is associated with two or more operation requests of the plurality of operation requests made by different users,
and the first authentication information is not stored locally in a first policy repository of the first application and the second authentication information is not stored locally in a second policy repository of the second application;
and storing the first and second operation requests or displaying the first and second operation requests on a display device.

21. The computer program product of claim 20 wherein validating the first or second operation request comprises,
sending a validation message to an originator of the first or second operation request; and invalidating the first or second operation request if the comparison between the first or second authentication information and the first or second operation request was not successful.

22. The computer program product of claim 21, wherein the first or second operation request is for a kerberos ticket.

23. The computer program product of claim 21, wherein the first or second operation request is for a public key infrastructure certificate.

24. The computer program product of claim 21, wherein the first or second operation request is for password modification.

25. The computer program product of claim 21, wherein the first or second operation request is for authentication.

26. The computer program product of claim 21, wherein the first or second operation request is for operation authorization.

27. The computer program product of claim 26, further comprising:

sending a rejection message, if the first or second operation request was invalidated;

checking for an account lockout policy; and incrementing the login failure count.

28. The computer program product of claim 27, further comprising checking a plurality of password state policy information, the plurality of password state policy information including password expiration information, expiration warning information, number of grace logins information, and forced password change count information.

29. The computer program product of claim 28, wherein the checking produces warning messages, the warnings being included in the validation message.

30. The computer program product of claim 20, wherein the first or second operation request may originate from a plurality of applications, at least one of the plurality of applications not possessing a separate policy repository or server.

31. A system for authenticating comprising:

a processor for:

receiving a plurality of operation requests from a plurality of different applications at a centralized enterprise security framework, wherein the plurality of operation requests comprise a first request from a first application and a second request from a second application, and the plurality of different applications comprise the first application and the second application;

retrieving a plurality of entries from a directory structure within the centralized enterprise security framework, wherein the directory structure stores the plurality of entries hierarchically, and the plurality of entries comprise a first authentication information for the first request and a second authentication information for the second request; and validating the first operation request by accessing the first authentication information and validating the second operation request by accessing the second authentication information, wherein the first and second authentication information are stored within the centralized enterprise security framework in a hierarchical manner at administrative points that define hierarchical relationships amongst users of the plurality of different applications of the centralized enterprise security framework such that the first authentication information or second authentication information is associated with two or more operation requests of the plurality of operation requests made by different users, and the first authentication information is not stored locally in a first policy repository of the first application and the second authentication information is not stored locally in a second policy repository of the second application;

and a non-transitory computer-usable medium for storing the first and second operation requests or a display device for displaying the first and second operation requests.

32. The system of claim 31, wherein validating the first or second operation request comprises sending a validation message to an originator of the first or second operation request; and invalidating the first or second operation request if the comparison between the first or second authentication information and the first or second operation request was not successful.

33. The system of claim 31, wherein the first or second operation request may originate from a plurality of applications, at least one of the plurality of applications not possessing a separate policy repository or server.

* * * * *

UNITED STATES PATENT AND TRADEMARK OFFICE
CERTIFICATE OF CORRECTION

| | | |
|---|---|---|
| PATENT NO. | : 8,463,819 B2 | Page 1 of 1 |
| APPLICATION NO. | : 11/084497 | |
| DATED | : June 11, 2013 | |
| INVENTOR(S) | : Shashikumar et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1433 days.

Signed and Sealed this
Thirtieth Day of December, 2014

Michelle K. Lee
*Deputy Director of the United States Patent and Trademark Office*